United States Patent
Lopatin et al.

(10) Patent No.: US 6,845,663 B2
(45) Date of Patent: Jan. 25, 2005

(54) METHOD AND DEVICE FOR DETERMINING AND/OR MONITORING THE LEVEL OF A MEDIUM IN A CONTAINER, OR FOR DETERMINING THE DENSITY OF A MEDIUM IN A CONTAINER

(75) Inventors: Sergej Lopatin, Lörrach (DE); Alexander Müller, Steinen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 10/416,516

(22) PCT Filed: Nov. 13, 2001

(86) PCT No.: PCT/EP01/13114

§ 371 (c)(1),
(2), (4) Date: Dec. 1, 2003

(87) PCT Pub. No.: WO02/42724

PCT Pub. Date: May 30, 2002

(65) Prior Publication Data

US 2004/0078164 A1 Apr. 22, 2004

(30) Foreign Application Priority Data

Nov. 22, 2000 (DE) ......................................... 100 57 974

(51) Int. Cl.[7] .............................................. G01P 11/10
(52) U.S. Cl. ..................................... 73/290 V; 73/32 A
(58) Field of Search ............................... 73/290 V, 291, 73/32 A, 64.53, 861.27

(56) References Cited

U.S. PATENT DOCUMENTS

| 3,170,094 | A | | 2/1965 | Roth | |
|---|---|---|---|---|---|
| 4,383,443 | A | * | 5/1983 | Langdon | 73/290 V |
| 4,594,584 | A | * | 6/1986 | Pfeiffer et al. | 340/620 |
| 4,601,200 | A | * | 7/1986 | Stoffelen | 73/290 V |
| 5,043,912 | A | | 8/1991 | Reus | |
| 6,044,694 | A | | 4/2000 | Anderson et al. | |
| 6,148,665 | A | * | 11/2000 | Getman et al. | 73/290 V |
| 6,236,322 | B1 | * | 5/2001 | Lopatin et al. | 340/612 |
| 6,389,891 | B1 | * | 5/2002 | D'Angelico et al. | 73/290 V |

* cited by examiner

*Primary Examiner*—Helen Kwok
(74) *Attorney, Agent, or Firm*—Bacon and Thomas

(57) ABSTRACT

The invention relates to a method and a device for determining and/or monitoring the fill level (F) of a medium in a container or, respectively, to a method and a device for establishing the density ($\rho$) of a medium in the container. The invention allows a highly accurate determination or monitoring of the fill level (F) or the density of a medium in a container. With reference to the method, the object is solved in that the influence of at least one disturbing parameter on the oscillation frequency of an oscillation-capable unit is established and correspondingly compensated in the determination of the fill level (F) of the medium in the container or, respectively, in the determination of the density ($\rho$) of the medium in the container.

15 Claims, 4 Drawing Sheets

METHOD AND DEVICE FOR DETERMINING AND/OR MONITORING THE LEVEL OF A MEDIUM IN A CONTAINER, OR FOR DETERMINING THE DENSITY OF A MEDIUM IN A CONTAINER

FIELD OF THE INVENTION

The invention relates to a method and a device for determining and/or monitoring the level of a medium in a container or for establishing the density of a medium in a container.

BACKGROUND OF THE INVENTION

Devices with at least one oscillation element, so-called vibration detectors, have been known for detecting or monitoring the level of a medium in a container. The oscillation element is usually at least one oscillation bar, which is secured to a membrane. The membrane is caused to oscillate using an electro-mechanical transducer, e.g. a piezo-electric element. Due to the oscillations of the membrane, the oscillation element secured to the membrane also oscillates.

Vibration detectors embodied as level detectors utilize the effect that the oscillation frequency and the oscillation amplitude depend on the particular degree to which the oscillation element is covered: While the oscillation element can carry out its oscillations in air free and undamped, it experiences a damping, and, as a consequence thereof, a frequency and amplitude change, as soon as it is submersed partially or completely in the medium. On the basis of a precalibrated frequency change, an accurate conclusion can be drawn as to the particular level in the container. Level measuring devices are also applied especially for overfill protection or as protection against pumps running empty.

The oscillation frequency of the oscillation element is also influenced by the particular density of the medium. Consequently, at constant degree of covering, there is a functional relationship for the density of the medium, so that vibration detectors are best suited both for level determination and for density determination. In practice for monitoring and detecting the level or density of the medium in the container the oscillations of the membrane are picked up and changed into electrical received signals by means of at least one piezo-element.

The electrical received signals are then evaluated in an evaluation electronics. In the case of a level determination, the evaluation electronics monitors the oscillation frequency and/or the oscillation amplitude of the oscillation element and signals the condition 'sensor covered' or 'sensor uncovered', as soon as the measured values move under, or over, a pre-assigned reference value. A corresponding report to the operating personnel can then be given optically or acoustically. Alternatively or supplementally, a switching process is triggered; in this way perhaps a feed or drain valve on the container is opened or closed.

The devices mentioned above for measuring level or density are used in a multitude of industrial branches, for instance in chemistry, in the foods industry or for water treatment. The band width of monitored fill materials reaches from water through yogurt, paints and lacquers, to highly viscous fill materials, like honey, or to strongly foaming fill materials, like e.g. beer.

Vibration detectors are, however, only completely dependent on the above-mentioned parameters 'level' and 'density' to a first approximation. Besides these, other physical parameters also influence the oscillation behavior of the oscillation element, process parameters such as pressure and temperature or the viscosity of the medium. Thus, as soon as the requirement is made, that the sensor be applied for highly accurate measurements or that it be used as a universally applicable measuring device in the high and low temperature range or in the high or low pressure range, then the influence of these parameters on the oscillation behavior must be taken into account. In principle, the influence of temperature and pressure on the measurement results becomes that much more important, the greater these parameters deviate from normal conditions. Similar considerations are true also with respect to the viscosity of the medium: A measurement device must in the future be able to produce reliable measurements for media of greatly differing viscosities.

SUMMARY OF THE INVENTION

An object of the invention is to provide a method and a device which allow highly accurate determination or monitoring of the level or the density of a medium.

With reference to the method, the object is attained by detecting and correspondingly compensating the influence of at least one disturbing parameter on the oscillation frequency of the oscillations-capable unit when determining the level of the medium in the container or when determining density of the medium in the container. In this way, it is assured that, for the case of level measurement, the switching points of the measuring device, which signal the conditions 'sensor covered' and 'sensor uncovered', are exactly defined. A malfunction of the measuring device, which can happen if temperature or pressure deviations create a false showing of attainment of the pre-assigned switching points, is reliably prevented. In the case of density measurement, the error tolerance is significantly reduced by the compensation of the influence of the different disturbing parameters on the oscillation behavior of the oscillation element, so that the method of the invention and the corresponding device are suited for highly accurate density measurements.

According to a preferred further development of the method of the invention, there is provided that a change in the oscillation frequency of the oscillation-capable unit caused by a change in the viscosity of the medium is compensated in the manner that the exciter frequency exhibits a phase-shift other than 90-degrees relative to the oscillation frequency of the oscillation-capable unit.

In particular, the phase-shift between the exciter frequency and the oscillation frequency of the oscillation-capable unit is so measured that a change occurring in the oscillation behavior is essentially independent of the viscosity of the medium and thus essentially only dependent on the immersion depth of the oscillation-capable unit in the medium, or, in other words, on the density of the medium. In practice, it has been found that a phase-shift of about 70-degrees in liquid media is best suited for eliminating the influence of viscosity on the measurement results. If the medium, however, is strongly foaming, then a phase-shift of about 120-degrees between exciter and oscillation frequency permits a sufficiently good compensation of the influence of the viscosity of the foam. Naturally, the phase-shift for compensating the influence of viscosity also depends decisively on the particular embodiment of the oscillation-capable unit.

According to an advantageous further development of the method of the invention, it is provided that at least one disturbing parameter is directly measured or indirectly detected. Preferably, characteristic curves are produced and stored on the basis of empirically established data to show the dependence of frequency change on at least one disturbing parameter. Naturally, it is also possible to calculate the characteristic curves on the basis of a mathematical model and to store that, in which case the mathematical model possibly again is based on empirically established data.

In one embodiment of the method of the invention, further parameters are taken into consideration in the choice of the correct characteristic curves. Especially of interest in the case of these parameters are the geometry and/or the dimensioning of the oscillation-capable unit, the material from which the oscillation-capable unit is made and/or, in the case of level determination, the installation position of the oscillation-capable unit in the container. The characteristic curves are thus also provided to be sensor-specific and/or system-specific.

A preferred form of the method of the invention provides that the at least one disturbing parameter is measured or determined and that the corresponding frequency change is taken into consideration in the case of level measurement in the determination of the switching point or in the case of density measurement in the determination of the density of the medium. In this way, it is possible to react immediately to fluctuations in the disturbing parameter and, therefore, to use the measuring device universally, that is to say independently of the conditions present at the location of measurement.

With reference to the device, the object of the invention is solved in that the control/evaluation unit determines the influence of at least one disturbing parameter on the oscillation frequency of the oscillation-capable unit and that the control/evaluation unit so corrects the frequency change that is registered on reaching the predetermined level that the influence of the disturbing parameter is eliminated, or that the control/evaluation unit takes into consideration the measurement error caused by the disturbing parameter in density determination.

As already indicated above, reference to the at least one disturbing parameter is a reference to temperature or pressure, or a reference to the viscosity of the medium. Naturally, the invention enables compensation of every other empirically available disturbing parameter that has an influence on the oscillation behavior of the oscillation element.

In order to always have the actual values of the temperature and/or pressure available, a temperature sensor and/or a pressure sensor are/is provided, which determine/determines temperature or pressure in the environment of the oscillation-capable unit. According to one embodiment of the device of the invention, the temperature sensor, e.g. a PT 100, and/or the pressure sensor are/is integrated into the device for determining level or density. Naturally, it is also possible to provide the temperature and/or pressure sensor as separate units and to position them in the container. Furthermore, it is also possible to determine, for example, the pressure or the temperature by way of the oscillation-capable unit itself. Especially in this case the stiffness between the drive/receiver unit and the membrane is measured, on which membrane for example oscillation bars in the form of a tuning fork are attached. Then, the reaction of the oscillation-capable unit to the exciter frequency is evaluated for the purpose of determining temperature or pressure.

According to a preferred further development of the device of the invention, a data transmission line or data bus is provided. The sensors and the separate units of the device of the invention send their data on this connection to the control/evaluation unit, or the sensors and the separate units of the device of the invention communicate on this connection with the control/evaluation unit. Preferably current industry standards are utilized for the communication, examples being PROFIBUS PA, FIELDBUS FOUNDATION, or HART.

BRIEF DESCRIPTION OF THE DRAWINGS

The invention is explained in greater detail on the basis of the following drawings, which show as follows.

DETAILED DESCRIPTION OF THE PREFERRED EMBODIMENTS

Figure 1:
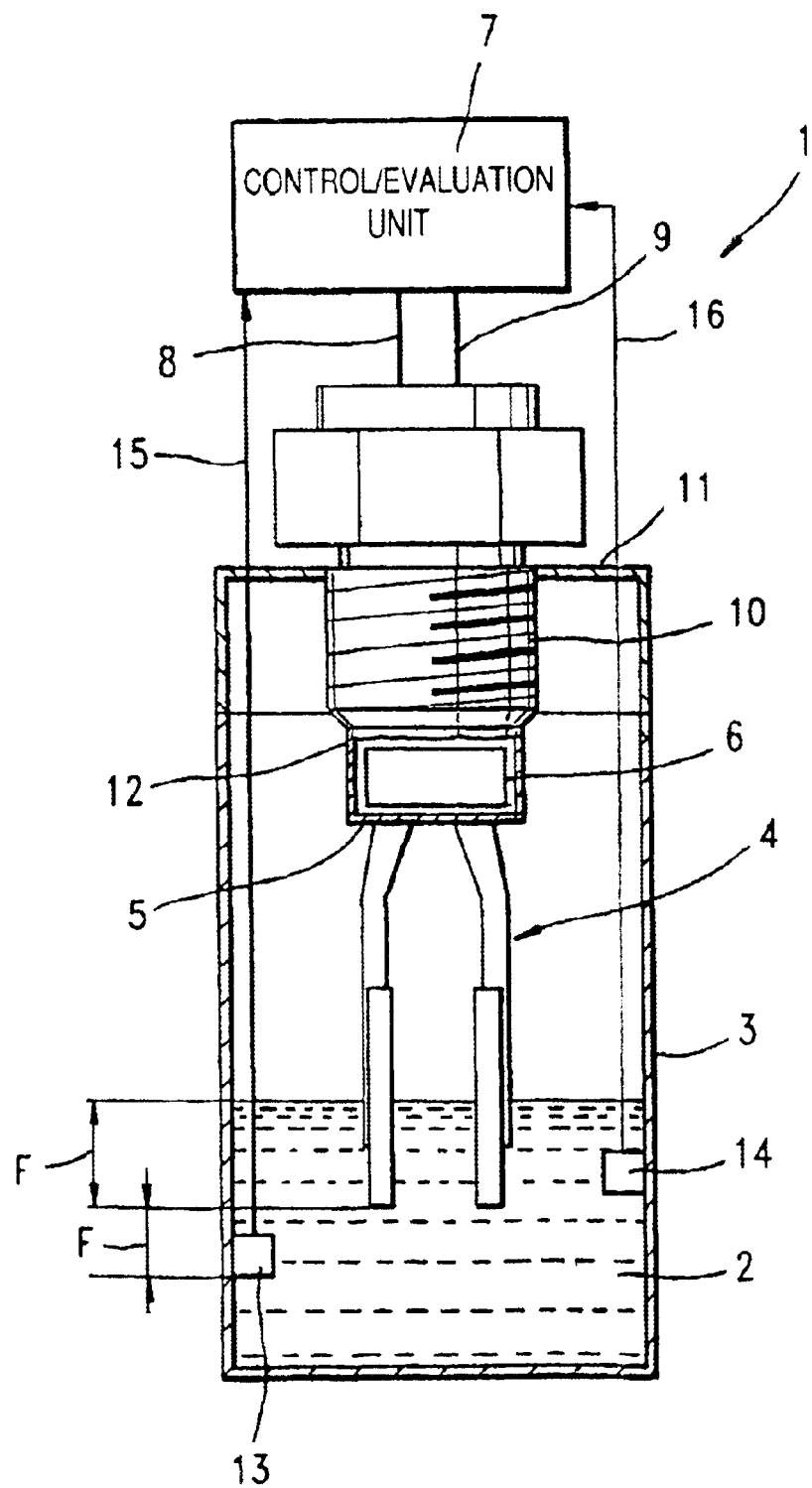
FIG. 1: a schematic representation of a preferred embodiment of the device of the invention.

FIG. 1 shows a schematic representation of the device of the invention for determining and/or monitoring the fill level F of a medium 2 in container 3. In a few words, of concern here is a limit detector. The device 1 shown in FIG. 1 is, of course, also, as already explained above, suitable for determining the density of the medium 2 in container 3. While in the case of level determination the oscillation-capable unit is immersed in the medium, or not immersed in the medium, only upon reaching the detected limit level, for monitoring or determination of density $\rho$ it must be continuously in contact with the medium down to a predetermined immersion depth E. For container 3, naturally a pipe can be used, with the medium 2 flowing through the pipe.

The device 1 exhibits an essentially cylindrical housing 12. A thread 10 is provided on the jacket surface of housing 12. Thread 10 serves for securing device 1 at the height of the predetermined fill level F in container 3 and is, in the illustrated case, arranged in a corresponding opening in lid 11 of container 3. Other types of securement, for example using a flange, can easily be substituted for the arrangement of the device 1 of the invention on the container 3 illustrated in FIG. 1.

Housing 12 is closed by a membrane, or diaphragm, 5 on its end region extending into container 3. For this purpose, membrane 5 is clamped at its edge region into housing 12. The oscillation-capable unit 4 extending into container 3 is secured to membrane 5. In the illustrated case, the oscillation-capable unit 4 is embodied as a tuning fork, thus including two oscillation bars separated from one another, attached to membrane 5, and extending into container 3.

Membrane 5 is caused to oscillate by a drive/receiver element 6, with the drive element 6a exciting the membrane 5 to oscillate with a predetermined exciter frequency. Drive element 6a is, for example, a stack drive or a bimorph drive. Both types of piezoelectric drives are sufficiently known from the prior art, that a description of them can be dispensed with here. Because of the oscillations of the membrane 5, the oscillation-capable unit 4 also executes oscillations. The oscillation frequency of unit 4 differs, depending on whether it is in contact with the medium, in which case the mass of the medium must move too, or, instead, it is oscillating freely and without contact with the medium 2.

As in the case of the drive unit 6a, the receiver unit 6b can likewise be a single piezoelectric element. The drive/receiver unit 6 excites the membrane 5 to oscillate as a function of a transmitted signal present at the piezoelectric element, and it serves to receive and convert the oscillations of the membrane 5 into an electrical received signal.

Piezo-electric elements change their dimensions (thickness, diameter, etc.) as a function of a voltage difference applied in the polarization direction. If an alternating voltage is applied, then the thickness oscillates: When the thickness increases, the diameter of the piezo-electric element decreases; conversely, when the thickness decreases, then the diameter of the piezo-electric element increases.

Because of this oscillating behavior of the piezoelectric element, the voltage difference causes the membrane 5 clamped into the housing to bend through. The oscillating bars of the oscillation-capable unit 4 arranged on the membrane 5 execute oppositely directed oscillations about their longitudinal axis because of the oscillations of the membrane 5. These oppositely directed oscillations have the advantage that the alternating forces exerted by each oscillating bar on the diaphragm 5 cancel one another. This minimizes the mechanical stress of the clamping, in that essentially no oscillation energy is transferred to the housing 12.

Also provided in the container are a temperature sensor 13 and a pressure sensor 14. Both sensors 13,14 and the vibration sensor deliver their measurements to the control/evaluation unit 7 for evaluation.

Figure 2:
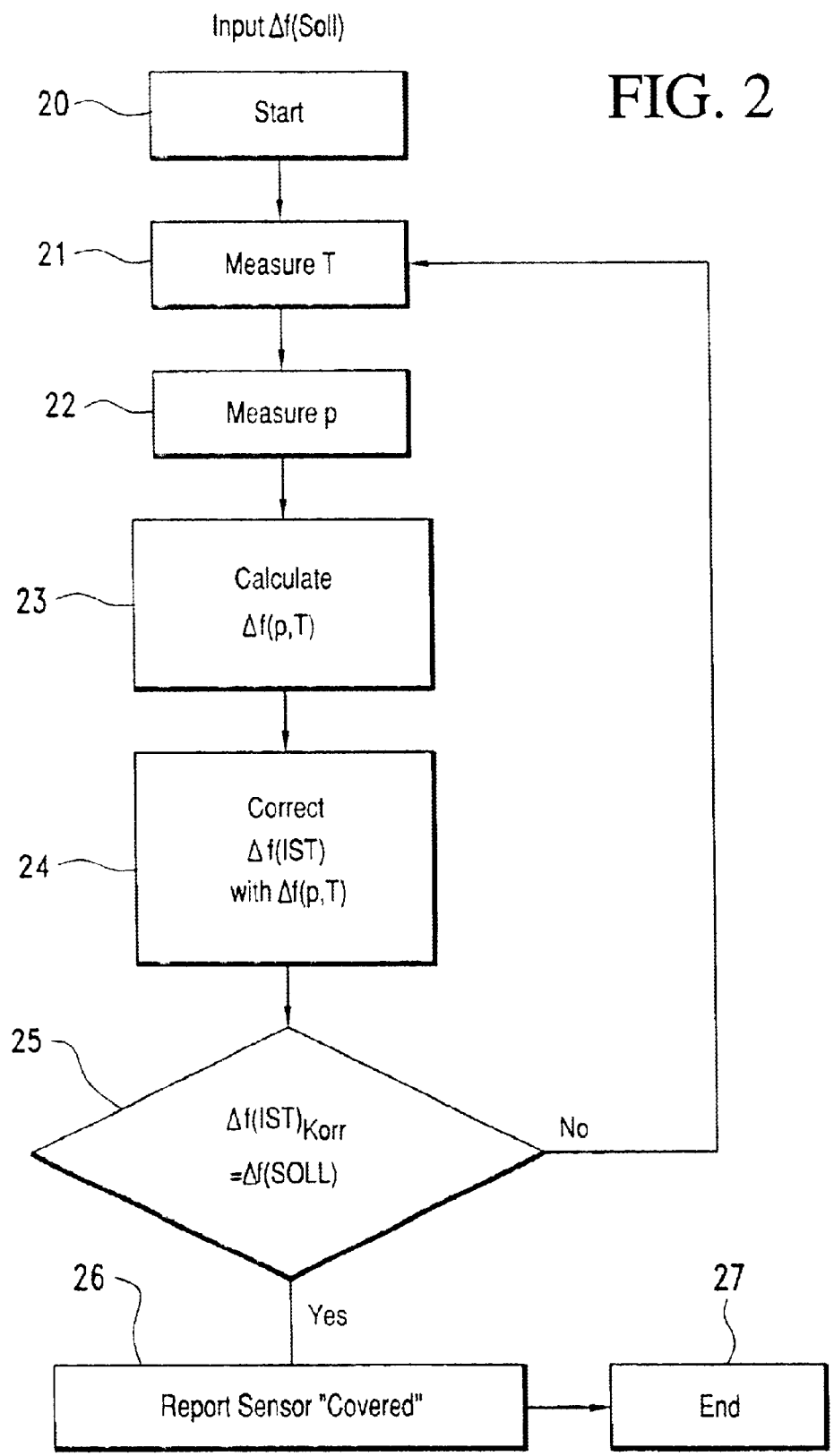
FIG. 2: a flowchart for operation of the control/evaluation unit in the case of level determination.

FIG. 2 shows a flowchart for operation of the control/evaluation unit 7 for the case of fill level determination. The associated frequency change established under standard conditions is input as setpoint for characterizing the switching point. Following program start at point 20, the actual temperature value T and the actual pressure value p are made available at program points 21,22. The corresponding frequency change $\Delta f(p,T)$ is calculated at program point 23 for the measured values T,p. The calculation can, for example, be done using an empirically established characteristic curve. This curve can be described by the following formula:

$$\Delta f(p,T) = p°(a°T + b°T^2 + c) + d°T + e.$$

In this formula, a,b,c,d,e are real numbers reflecting sensor- and system-dependent parameters. Establishment of these parameters proceeds, for example, using empirically established characteristic curves. For different sensors or installation types of a level- or density-measuring instrument in the container, a preferred variant of the device of the invention provides different sets of characteristic curves. In the simplest case, operating personnel call up these sets of characteristic curves for the correct establishment of switching point or density by pressing a button, so that they are available subsequently for the control/evaluation unit.

Clearly an interesting aspect of the invention is also that these different sets of characteristic curves, which were empirically established or calculated using a mathematical model and are sensor- and/or system-specific, can be applied also completely independently of the previously described temperature-, pressure- and/or viscosity-compensation.

The frequency change $\Delta f(p,T)$ occurring under the influence of the disturbing parameters (pressure p, temperature T) is subsequently taken into consideration at program point 25 in the frequency change $\Delta f$(actual) reflecting the fill level F or the density $\rho$. Only when the corrected actual value $\Delta f$(actual)Corr agrees with the input setpoint $\Delta f$(set) of the frequency change is a report "sensor covered" issued at point 26. So long as the aforesaid is not fulfilled, program points 21 to 25 are run through in a loop. When the report provided in 26 is obtained, the program ends at 27.

Figure 3:
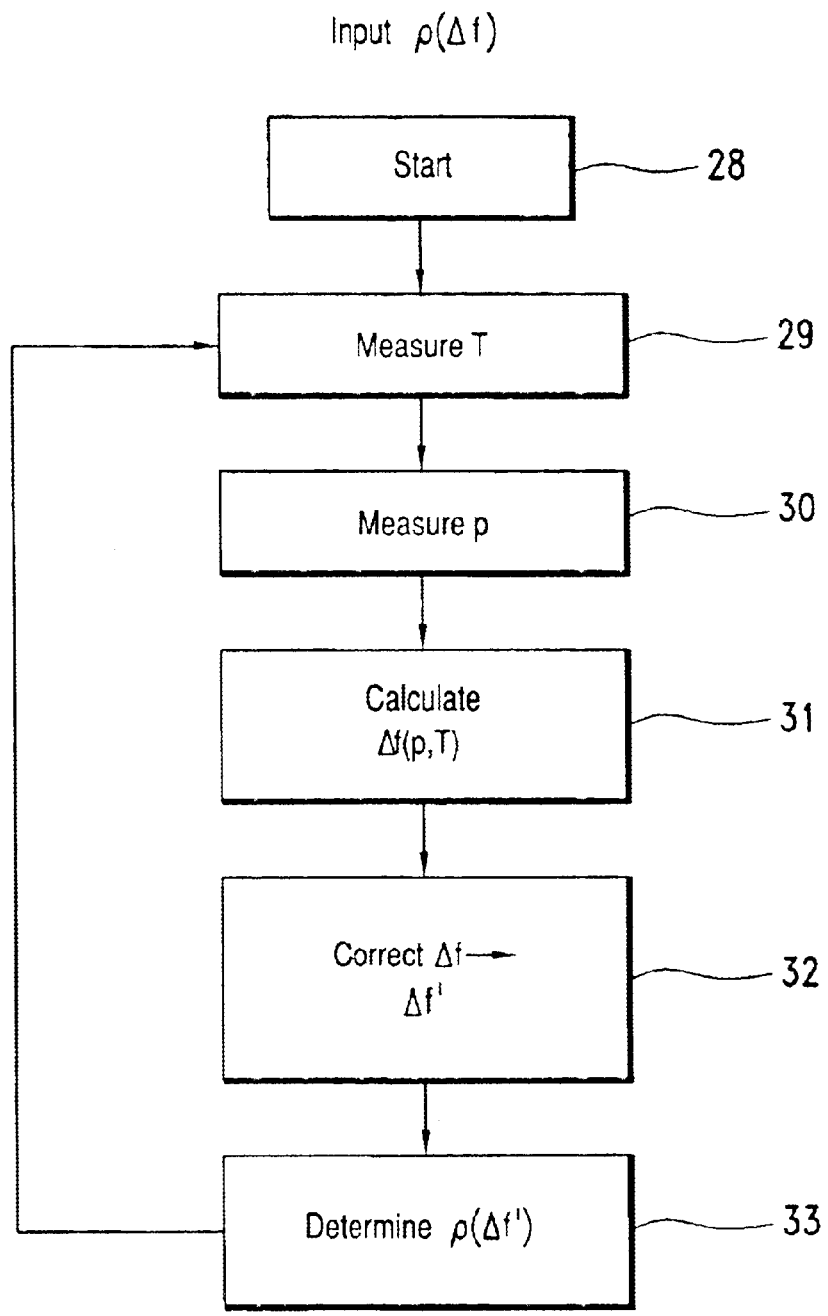
FIG. 3: a flowchart for operation of the control/evaluation unit in the case of density determination.

FIG. 3 shows a flowchart for operation of control/evaluation unit 7 for the case of density determination. A characteristic curve established under corresponding standard conditions is input as the setpoint for the density $\rho(\Delta f)$. This characteristic curve gives the density $\rho$ as a function of the frequency change $\Delta f$. Knowing the values of temperature T and pressure p, which are measured at program points 29,30, the associated frequency change $\Delta f(p,T)$ is calculated or otherwise established at 31. This frequency change $\Delta f(p,T)$ is taken into account in determining the actual frequency change $\Delta f'$ uninfluenced by these disturbing parameters p,T (point 32), so that the corrected frequency change $\Delta f'$ reliably reflects the actual density $\rho(\Delta f')$ of the medium 2 (program point 33).

Figure 4:
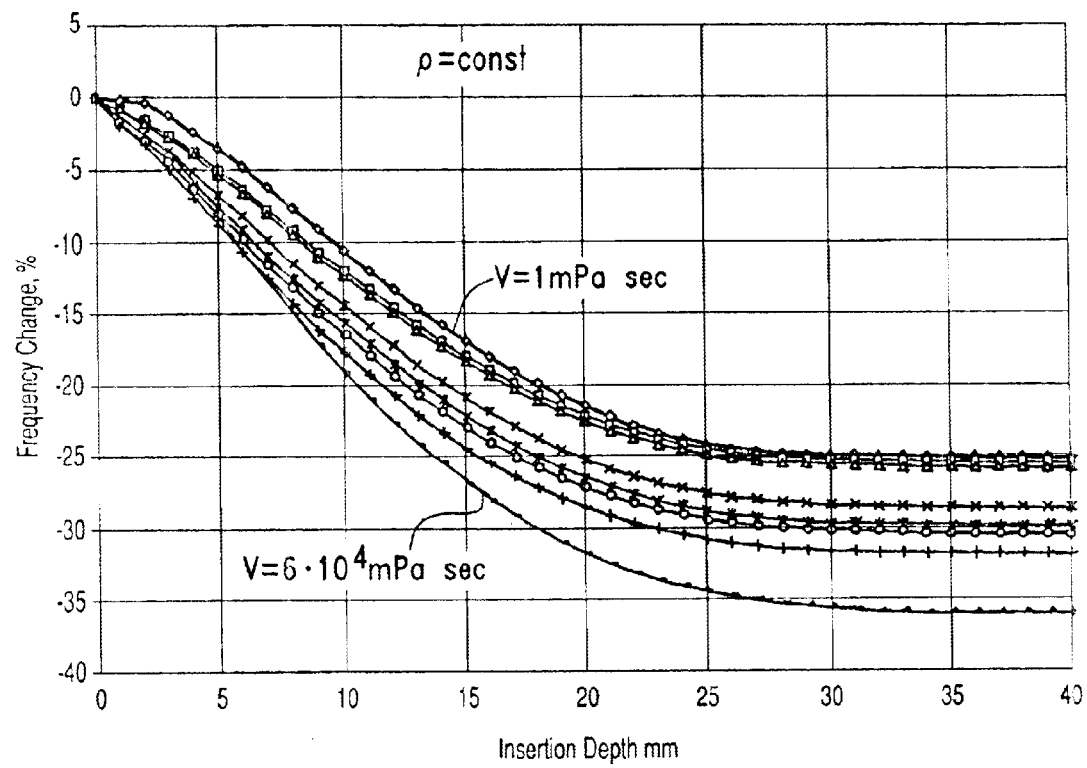
FIG. 4: a graphical representation of the characteristic curves $E(\Delta f)$ for different viscosities

FIG. 4 shows graphically the immersion depth E as a function of the frequency change $\Delta f$ for different viscosities V. The two extreme cases of viscosities of 1 mPasec and 60,000 mPasec are correspondingly marked in FIG. 4. As can be clearly seen, the frequency change $\Delta f$ does not depend only on the immersion depth E of the oscillation-capable unit 4 in the medium 2 but also significantly on the viscosity V of the measurement medium 2. It is to be recalled at this point that the invention is to relate to a device which is universally applicable for fill level or density measurements in the most different of media 2. If the different viscosities V of the media 2 were not taken into account in the invention, a switching procedure could, for example, be triggered, even though the input fill level had not yet really been reached. Likewise, the measurement errors in density measurement would be unacceptably large.

Figure 5:
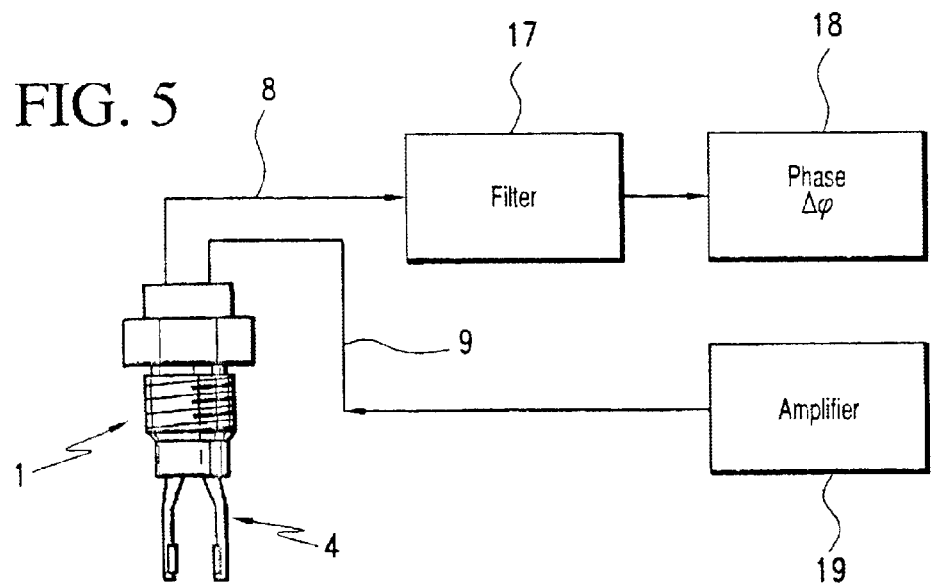
FIG. 5: a schematic representation of a circuit for compensating frequency changes resulting from viscosity of the medium.

FIG. 5 shows a schematic representation of a circuit for compensating a frequency change $\Delta f$, which (as is clearly seen in FIG. 4) arises due to the influence of viscosity V of the measured or monitored medium 2. Stated in a few words, the illustrated circuit compensates for the disturbing parameter 'Viscosity V' automatically. As already described above, the phase shift $\Delta_\phi$ between the exciter frequency $f_E$ and the oscillation frequency $f_S$ of the oscillation-capable unit 4 is sized for this purpose such that an occurring frequency change $\Delta f$ is essentially independent of the viscosity V of the medium 2 and thus essentially only dependent on the immersion depth E of the oscillation-capable unit 4 in the medium 2, that is to say, on the density $\rho$ of the medium 2.

In particular, the received signal representing the oscillation of the oscillation-capable unit is filtered in filter 17; then the filtered signal undergoes a phase-shift $\Delta_\phi$ sized such that the frequency change $\Delta f(V)$ caused by the viscosity V has no longer any influence on the frequency change $\Delta f$ of the oscillation frequency of the oscillation-capable unit 4. If the temperature- and/or pressure-values lie within a range in which they have no measurable effect on the frequency change $\Delta f$ of the oscillation-capable unit 4, then the influence of viscosity V is compensated without problem. On the other hand, if the temperature-and/or pressure-values lie in a range in which they influence the frequency change $\Delta f$ so strongly that measurement errors and malfunctioning of the sensor occur, then the above-described compensation of the influence of temperature and/or pressure becomes additionally required.

It has been observed that, for a large number of liquids of different viscosity V, the influence of viscosity can be compensated with sufficient quality using a phase shift of 70-degrees. For dense foams (density>0.6 g/cm$^3$), a phase shift in the range 120- to 140-degrees is best suited for the compensation.

When all of the frequency changes $\Delta f(p,T,\rho)$ caused by temperature T, pressure p and/or density $\rho$ are under control, then a determination of viscosity V is conversely possible.

List of Reference Numerals
1 device of the invention
2 medium
3 container
4 oscillation-capable unit, especially a tuning fork
5 membrane
6 drive/receiver unit
7 control/evaluation unit
8 data line
9 data line
10 thread
11 lid
12 housing
13 temperature sensor
14 pressure sensor
15 data line
16 data line
17 filter
18 phase shifter
19 amplifier

What is claimed is:

1. A method for determining and/or monitoring a predetermined fill level of a medium in a container or for establishing a density of a medium in the container, with a device including an oscillation-capable unit, the method comprising the steps of:

placing the oscillation-capable unit at one of: the height of the predetermine fill level and immersed down to a defined immersion depth in the medium;

exciting the oscillation-capable unit to oscillate by means of an exciting oscillation;

establishing an influence of viscosity affecting an oscillating frequency of the oscillation-capable unit; and correspondingly compensating for the influence of viscosity for one of: affecting the oscillating frequency in the determination of the fill level, and determining the density of the medium in the container, wherein one of an attainment of the predetermined fill level is recognized, as soon as the oscillation-capable unit oscillates with an oscillation frequency that shows a predetermined frequency change relative to an exciter frequency, and the density of the medium is established on the basis of the oscillation frequency of the oscillation-capable unit.

2. The method as defined in claim 1, further comprising the step of:

compensating for a frequency change of the oscillation-capable unit arising from a change of the viscosity of the medium, in a manner that the exciter frequency exhibits a phase-shift other than 90-degrees relative to the oscillation frequency of the oscillation-capable unit.

3. The method as defined in claim 2, further comprising the step of:

sizing the phase-shift between the exciter frequency and the oscillation frequency of the oscillation-capable unit such that an occurring frequency change is essentially independent of the viscosity of the medium and thus essentially only dependent on one of: the immersion depth of the oscillation-capable unit in the medium and the density of the medium.

4. The method as defined in claim 1, further comprising the step of:

establishing an effect of at least one additional disturbing parameter affecting the oscillation frequency of the oscillation-capable unit, and correspondingly compensating if the disturbing parameter is within a range causing frequency changes leading to measurement errors and malfunctions of the sensor.

5. The method as defined in claim 4, wherein:

the at least one disturbing parameter is one of: directly measured and indirectly established.

6. The method as defined in claim 1, further comprising the step of:

obtaining and storing characteristic curves which provide frequency change of the oscillation-capable unit as a function of at least one disturbing parameter.

7. The method as defined in claim 6, further comprising the step of:

obtaining the characteristic curves on the bases of one of: a mathematical model and empirically established data.

8. The method as defined in claim 6, further comprising the step of:

considering other parameters in a selection of the characteristic curves, including: the geometry and/or dimensions of the oscillation-capable unit; the material from which the oscillation-capable unit is made and/or, in the case of fill level determination, an installation position of the oscillation-capable unit in the container.

9. The method as defined in claim 1, further comprising the step of:

measuring or establishing at least one disturbing parameter and a corresponding frequency change is taken into consideration in fixing a switching point in the case of one of the fill level determination and the density determination of the medium.

10. A device for determining and/or monitoring one of a predetermined fill level of a medium in a container and a density of the medium in the container, comprising:

an oscillation-capable unit arranged according to one of: at the height of the predetermined fill level, and immersed in the medium down to a defined immersion depth;

a driver/receiver unit which uses a predetermined exciter frequency to cause the oscillation-capable unit to oscillate and which receives the oscillations of the oscillation-capable unit; and a control/evaluation unit which does one of: recognizes reaching the predetermined fill level as soon as a previously set frequency change occurs and reporting the density of the medium on the basis of an oscillation frequency of the oscillation-capable unit, wherein:

said control/evaluation unit established an influence of viscosity on the oscillation frequency of said oscillation-capable unit;

said control/evaluation unit corrects frequency changes at which the reaching of the predetermined fill level is registered, in such a way that the influence of a disturbing parameter is eliminated, or takes into consideration a measurement error caused by a disturbing parameter in determining density.

11. The device as defined in claim 10, further wherein:
said control/evaluation unit takes into consideration the measurement error caused by at least one additional disturbing parameter on the oscillation frequency of said oscillation-capable unit and compensates said oscillation frequency correspondingly, if the disturbing parameter is within a range causing frequency changes leading to measurement errors and malfunctions of a sensor.

12. The device as defined in claim 11, further wherein:
the at least one disturbing parameter is one of temperature and pressure of the medium.

13. The device as defined in claim 10, further comprising one of:
a temperature sensor and a pressure sensor which determine temperature and pressure, respectively in an environment of said oscillation-capable unit.

14. The device as defined in claim 13, further wherein:
said temperature sensor and said pressure sensor are integrated in the device for determining the fill level or density.

15. The device as defined in claim 13, further comprising:
a data transmission or data bus line is provided, over which data is transmitted from separate units of the device to said control/evaluation unit or from said control/evaluation unit to the separate units.

* * * * *